US006243400B1

(12) United States Patent
Deutsch et al.

(10) Patent No.: US 6,243,400 B1
(45) Date of Patent: Jun. 5, 2001

(54) SUBRATE VOICE SWITCHING OVER SWITCHING AND TELECOMMUNICATION NETWORKS

(75) Inventors: Douglas Anthony Deutsch, Aurora; David B. Smith, Hinsdale, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/032,055

(22) Filed: Feb. 27, 1998

(51) Int. Cl.[7] ............................. H04J 3/22; H04L 12/50
(52) U.S. Cl. ............................. 370/540; 370/376
(58) Field of Search ........................ 370/375, 376, 370/465, 477, 521, 391, 538, 540, 544, 360

(56) References Cited

U.S. PATENT DOCUMENTS

| 4,965,787 | * | 10/1990 | Almond et al. | 370/466 |
|---|---|---|---|---|
| 5,287,350 | * | 2/1994 | Ito et al. | 370/379 |
| 5,784,369 | * | 7/1998 | Romiti et al. | 370/358 |
| 6,044,082 | * | 3/2000 | Nygard et al. | 370/437 |
| 6,047,007 | * | 4/2000 | Munday et al. | 370/545 |
| 6,052,391 | * | 4/2000 | Deutsch et al. | 370/540 |

* cited by examiner

Primary Examiner—Douglas W. Olms
Assistant Examiner—Ken Vanderpuye
(74) Attorney, Agent, or Firm—Werner Ulrich (57) ABSTRACT

Apparatus for switching full rate (e.g., 64 kilobit per second) signals and composite signals comprising a plurality of subrate signals (e.g., 32 kilobit per second subrate signal). The apparatus includes a unit for compressing selected ones of a plurality of full-rate signals into a smaller plurality of full-rate single and composite signals, and apparatus for decompressing composite signals into a plurality of full-rate signals. The main elements of the switching fabric of the switch continue to switch full-rate signals. Advantageously, during periods of heavy load, the switching network fabric of a switching system can carry more calls, and more traffic can be carried between switches equipped for subrate switching.

9 Claims, 6 Drawing Sheets

SUBRATE VOICE SWITCHING OVER SWITCHING AND TELECOMMUNICATION NETWORKS

RELATED APPLICATION

This application is related to an application entitled "Dynamic Assignment of Subrate Voice Channels in Telecommunication Networks" being filed concurrently by the inventors of this application and being assigned to the same assignee.

TECHNICAL FIELD

This invention relates to methods and apparatus for switching digital voice signals in telecommunication networks.

PROBLEM

Today, a very large fraction of voice telecommunications traffic is transmitted in digital form. Most of this traffic is transmitted as a series of pulse code modulation (PCM) signals wherein eight thousand samples per second are transmitted each as an eight bit quantity. The 64 kilobit per second signal faithfully reproduces voice signals in the telephone band (i.e., between 200 and 3300 Hertz). It is well known that 64 kilobits are not required to faithfully reproduce voice signals in the telephone band. Recently, many low cost coder/decoders (Codecs) have been found which will transmit the faithful reproduction of voice signals at subrates of 32 kilobits per second, 16 kilobits per second, 8 kilobits per second and even lower rates, thus permitting a full rate (64 kilobits per second) channel to convey multiple voice signals. As a result, the opportunity exists to use present time slot interchange (TSI) switches designed to switch 64 Kb signals, for switching many more voice signals than is possible with the exclusive use of 64 kilobits per second coding and switching. However, the prior art does not teach any good way of mixing different voice signal rates in economical switching systems without requiring a radical redesign of these systems and a very costly replacement effort. A problem of the prior art, therefore, is that there is no economical way of introducing different rates (subrates) of voice transmission into the digital switches designed for switching full rate (64 kilobit per second) signals.

SOLUTION

The above problem is solved and an advance is made over the prior art in accordance with our invention wherein sub-rate voice signals are generated and bundled into full rate signals (e.g., 64 kilobit signals) prior to being switched in a digital switch such as a TSI switching network (switch); the bundling is performed in such a way as to minimize intermediate sub-rate switching by assembling sub-rate signals for a common destination (port).

In accordance with one preferred embodiment of Applicants' invention, a line or trunk unit, for serving lines or trunks whose service profile indicates that they may use compressed (subrate) signals, comprising a plurality of 64K Codecs is connected to a first unit which compresses selected 64K signals and bundles them into a smaller number of 64K outputs. These bundled signals are then switched, using existing TSI switching fabrics, transmitted to a destination switch module, and unbundled in a second unit which decompresses bundled 64K signals into single voice 64K signals for transmission to a destination line or an intermediate trunk.

DETAILED DESCRIPTION

Figure 1:
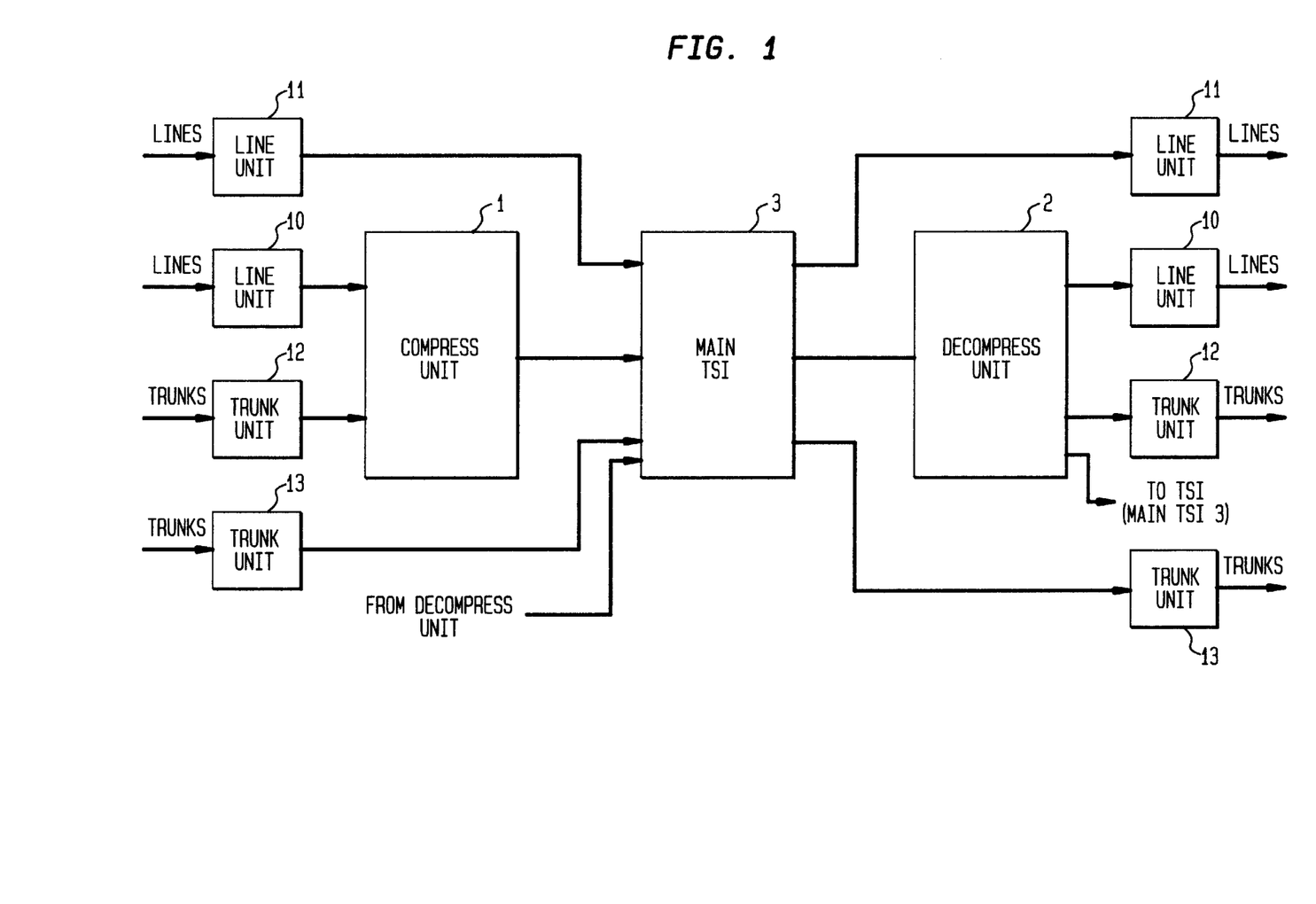
FIG. 1 is a block diagram illustrating the switching configuration for compressing and switching compressed voice signals.

FIG. 1 is a Block diagram illustrating the basic principles of Applicants invention. Only one direction of transmission is shown since the other direction is basically identical. The switching fabric of Applicants' invention comprises: a compress unit 1 for optionally compressing selected 64K signals into 32K, 16K, or 8K signals as appropriate based on the service order for the affected customer; a main TSI unit 3 for switching multiplexed 64K signals, some of which may contain Subrate signals; and a decompress unit 2 for accepting multiplexed 64K signals, some of which may contain sub-rate signals and expanding any Subrate signals received from the main TSI unit into 64K signals. Line units 10 and 11 are shown, line unit 10 being connected to the compress unit 1, and line unit 11 being connected directly to the main TSI 3. Line unit 11 serves lines whose 64K signals are not compressed, whereas line unit 10 serves lines whose 64K signals are compressed as directed. Trunk units 12 and 13 are connected to interoffice trunks entering the switching system shown in FIG. 1. Trunk unit 12 serves trunks, some of which may carry compressed signals. Trunk unit 13 which is directly connected to main TSI 3 serves trunks which do not carry compressed (i.e., sub-rate) signals. Similarly, decompress unit 2 is connected to Line unit 10, and Trunk unit 12 for carrying outgoing signals, and also has an output connected to the Main TSI Unit 3, to allow decompressed signals to be reswitched.

While the main TSI unit 3 as shown in FIG. 1 is a single block, in many digital systems this block comprises a plurality of modules. In some systems, TSI modules can be interconnected by a time multiplexed switch as in the 5ESS®-2000 switch manufactured by Lucent Technologies, Inc.; the Main TSI Unit 3 includes such time multiplexed switches. Many other TSI arrangements are known in the prior art, including a plurality of stages of pure TSI switches. The main point is that the block labelled Main TSI Unit 3 is used for switching multiplexed 64K signals; the Main TSI Unit 3 does not perform any sub-rate switching.

Figure 2:
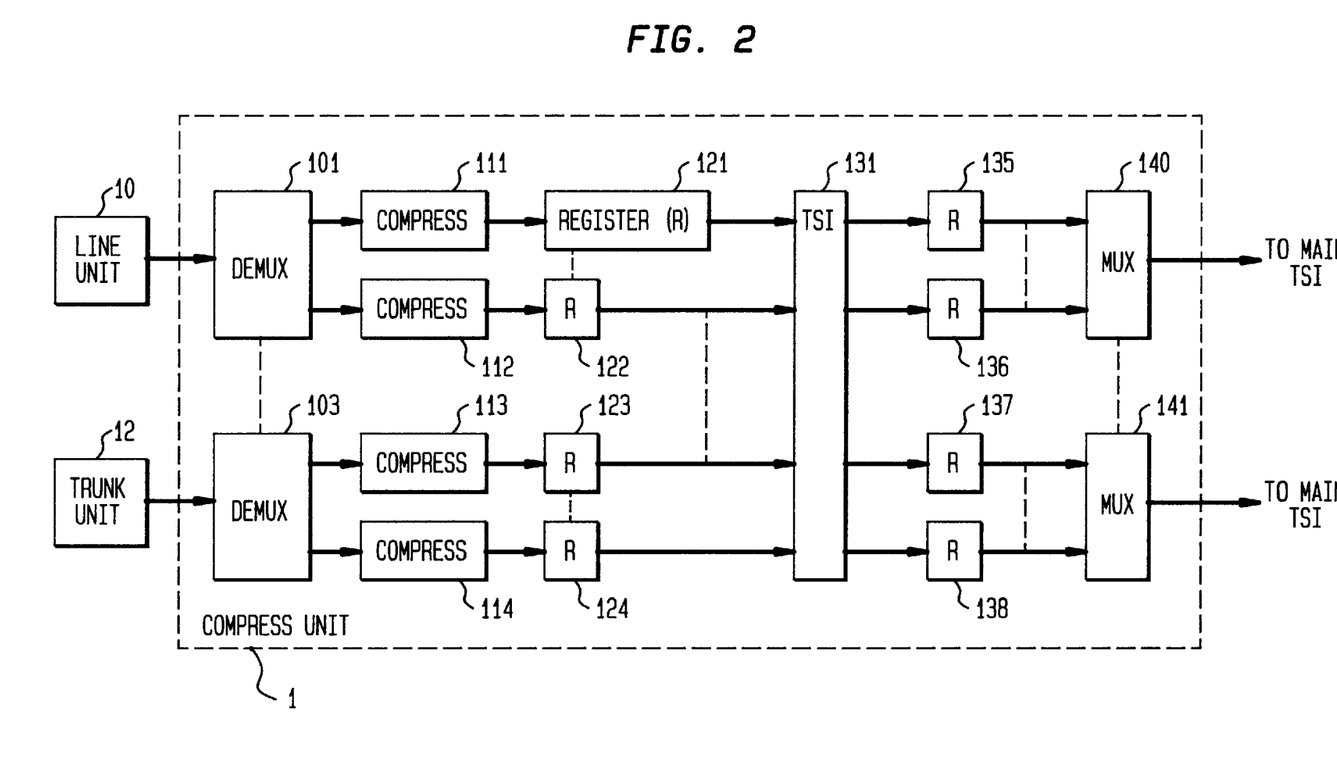
FIG. 2 is a block diagram of a voice compression unit.

FIG. 2 shows details of the compress unit 1. Signals received from line unit 10 are fed to a demultiplex unit 101 whose outputs are fed to a plurality of compress units 111, . . . , 112. In order to handle the case in which no compression of the 64K signals is desired, one or all of the compress units can have a pass through state where they simply transmit a 64K signal. In the preferred embodiment shown in FIG. 2, each of the compress units receives a 64K signal, and generates a 64K, 32K, 16K, or 8K sub-rate signal which is fed to its corresponding register. The register 121 is fed by compress unit 111, . . . , register 122 is fed by compress unit 112.

Demux unit 103 is connected to trunk unit 12. The output of Demux unit 103 is sent to split/compress units 113, . . . , 114. These units perform the split function to split a 64K signal into a plurality of subrate signals, if the incoming trunk carries subrate signals multiplexed into a 64K bit stream. Signaling messages, sent over CCS7 or some reliable packet network, alert the switch at the far end of a trunk that the trunk is carrying multiple subrate signals ("stuffed 64K" signals) and the makeup (e.g., 16, 8, 8, 32Kb subrate signals), of the 64K bit stream. The split/compress units perform the compress function if the incoming trunk signal carries only a basic 64K voice channel, and it is desirable to convert a plurality of such 64K channels into a plurality of subrate signals for switching within the switch of FIG. 1, and for possible transmission as subrate signals to another switch if the switch of FIG. 1 is acting as a tandem switch for a particular incoming 64K signal. In case neither splitting nor compression is being evoked for a particular incoming 64K signal, the split/compress unit has the capability for simply passing the 64K signal directly to its corresponding output register. The switch contains intelligence to determine the subrate, if any, for calls switched to a particular line or trunk, based on the class of service of that line or trunk, and optionally, the class of service of the terminating line in a distant switch.

The output registers of the compress units 111, . . . , 112, and split/compress units 113, . . . , 114, namely registers 121, . . . , 122 and 123, . . . , 124 respectively are inputs to a TSI unit 131. TSI Unit 131 is controlled to sample its input registers in such a way as to bundle together the subrate signals that are destined for a common decompress unit. The outputs of TSI unit 131 are all 64K signals, some of which may be carrying subrate signals. ("stuffed 64K"). For the case in which an output signal of TSI unit 131 carries a plurality of input subrate signals to TSI unit 131, the control memory of the TSI is arranged to sample the registers containing a sub-rate signal at a sub-multiple of the basic 8 kilohertz sampling rate of the TSI. The output of the TSI 131 feeds a plurality of registers 135, . . . , 136; . . . ; 137, . . . , 138 which feed a plurality of multiplexers 140, . . . , 141 which in turn are the inputs to the main TSI Unit 3.

Figure 3:
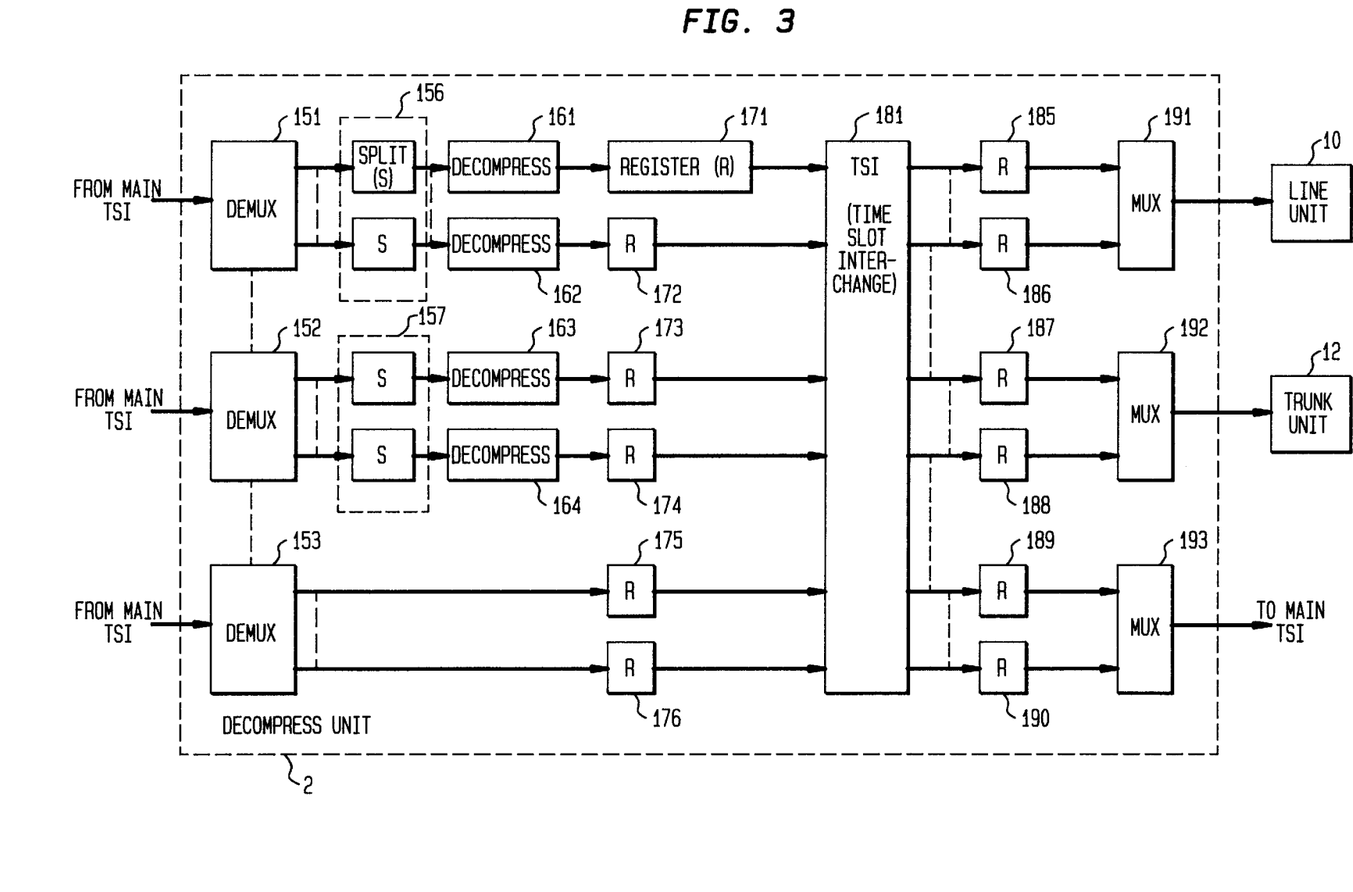
FIG. 3 is a block diagram of a decompression unit.

FIG. 3 is a block diagram of the decompress unit 2. Inputs are received in demultiplexers 151, . . . , 152, . . . , 153. Demultiplexers 151 and 152 are shown as being connected to decompress circuits 161, . . . 162; . . . ; 163, . . . , 164 respectively. The decompress circuits are each connected to a register feeding a TSI unit 181. Demultiplexer 153 directly feeds a group of registers 175, . . . , 176 connected to TSI unit 181. Demultiplexers 151 and 152 are used for signals, some or all of which may be in compressed form, and require decompression in order to generate a 64K signal as an input to a line or trunk unit. Demultiplexer 153 directly feeds registers 175, . . . , 176 connected to TSI unit 181, and receives signals that are not to be decompressed. The signals are either already in 64K form, or are to be transmitted as multiplexed compressed signals to a trunk unit for transmission in the multiplexed compressed form. All the inputs to TSI unit 181 are 64K signals, each representing either a single communication or a multiplexed group of compressed communications, and the outputs of TSI 181 are decompressed (full rate) signals sent to registers 185, . . . , 186; . . . ; 187 . . . , 188 which feed multiplexers 191, . . . , 192. These latter multiplexers are then connected to line or trunk units for connection to line or trunk facilities. In addition, registers such as 189 . . . , 190 feed multiplexers such as 193, whose output signal is sent back to Main TSI Unit 3 for further switching.

Between Demultiplexer 151 and the decompress units 161, . . . , 162 is a signal splitting unit 156 to supply to the decompress unit the correct sub-channel required by that decompress unit. In case no decompression is required for the signals from the Demultiplexer, one of the outputs of the splitting unit is simply the received 64K signal which bypasses decompression, for example by being fed to a decompress unit which is in a state wherein it simply passes its input signal to a TSI input register such as register 171.

Figure 4:
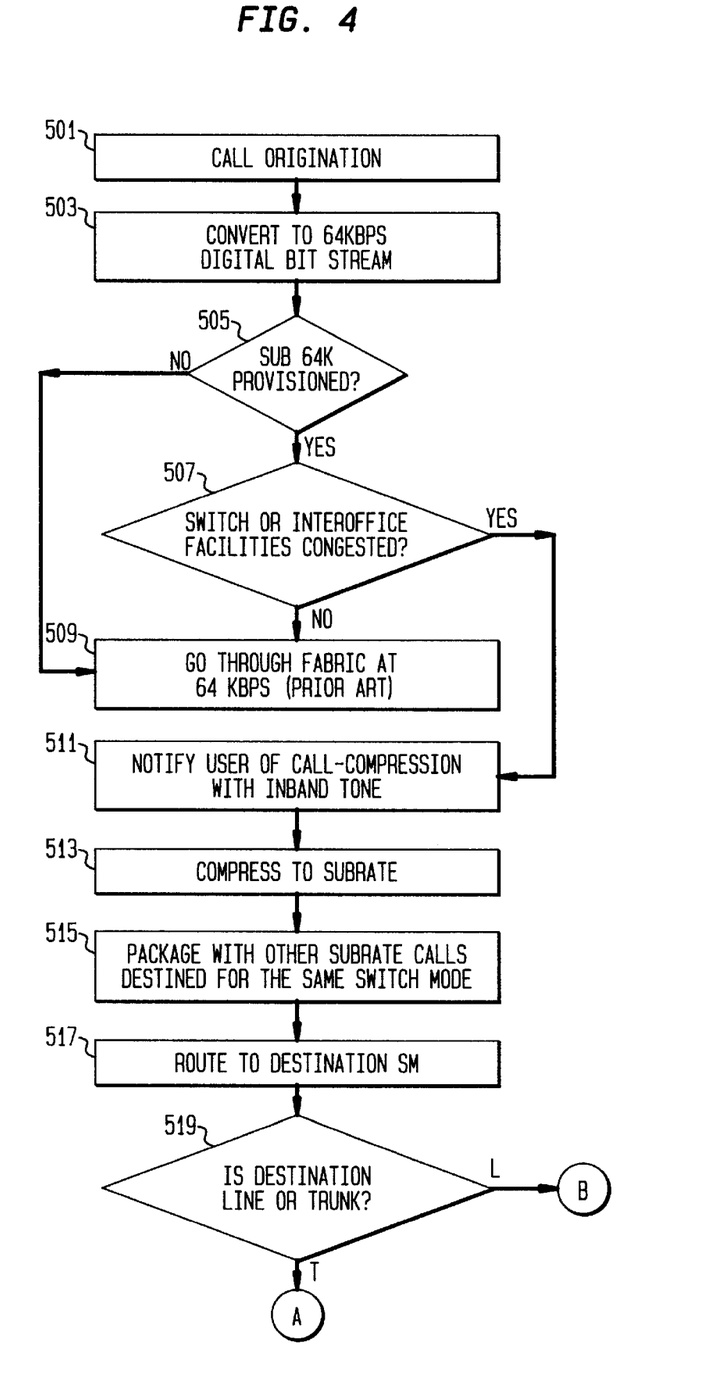
FIGS. 4 and 5 are flow diagrams showing the progress of an originating call.
Figure 5:
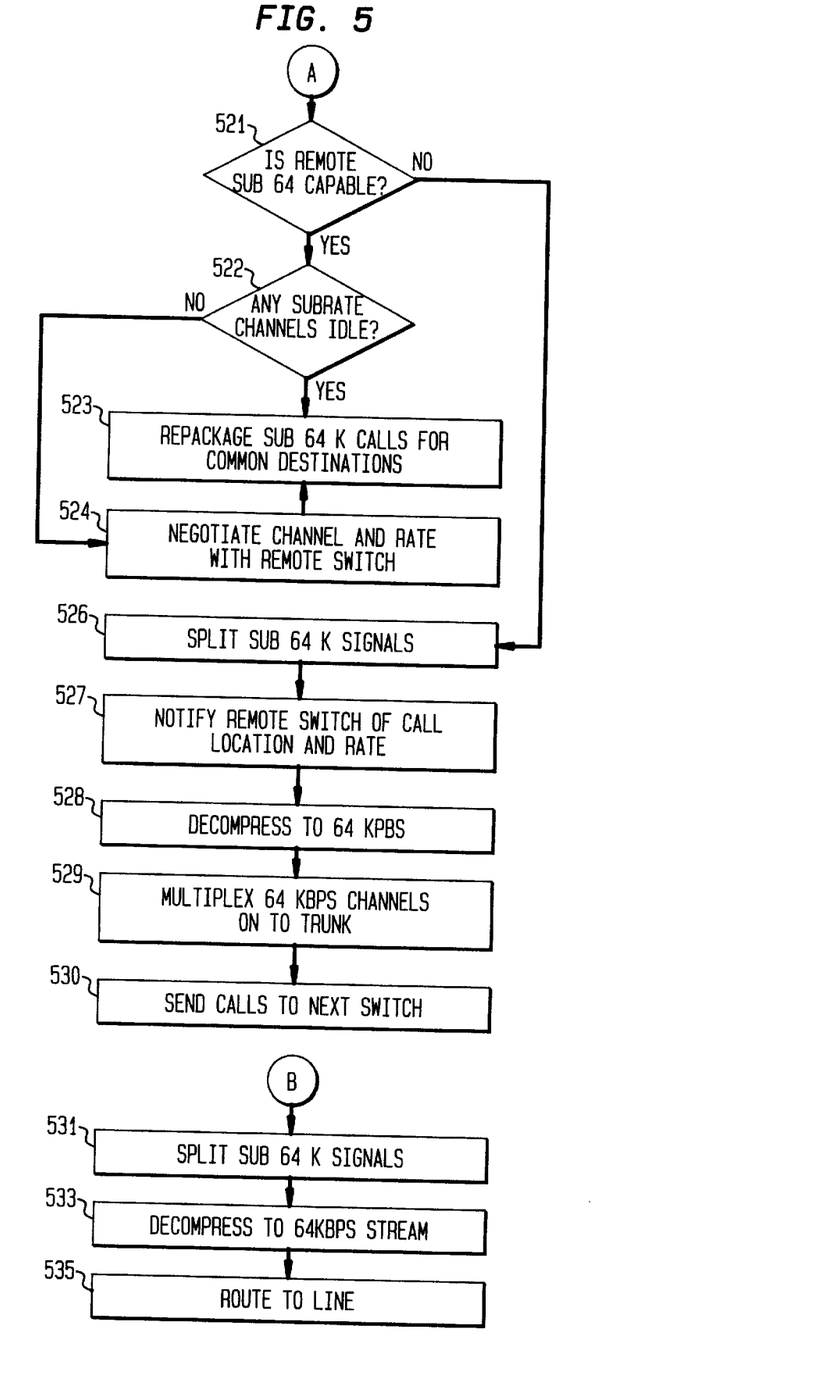

FIGS. 4–5 illustrate the method of Applicants' invention for an originating call. A call is originated (Action Block 501 (FIG. 4)); the call communication signal is converted into a full rate 64 kilobit per second digital bit stream (Action Block 503). Test 505 is then used to determine if this switch is provisioned to derive subrate signals. If not, then the call goes through the switching fabric of the originating switch at 64 kilobit per second (Action Block 509) and is subsequently treated as in the prior art. If this switch is provisioned for subrate ("stuffed 64K") switching, then test 507 is used to determine whether the switch is congested, i.e., whether the traffic load exceeds a threshold, or whether the transmission facilities to the destination switch are congested, i.e., carrying more traffic than a threshold. If neither of these conditions exist, then Action Block 509 previously described is entered. If there is congestion, then the user is notified of the call compression with an in-band tone, or an out band message (Action Block 511), after first determining whether the service profile of the calling customer allows for compression of his/her signals, and the 64 kilobit signal is compressed to some permitted subrate (e.g., 32K, 16K, or 8K), (Action Block 513). Note that while in this example a 32 kilobit sub-rate is used as the specific subrate being implemented, the switch can be arranged to provide different subrates which preferably should be a sub-multiple of the 64 kilobit full rate. It may well be that initially only a 32 kilobit subrate is used; as the switches become more heavily loaded, 16 kilobit subrate, or even 8 kilobit subrate signals can be used. This can be determined by service provisioning, and by resources congestion.

Subrate signals are then bundled along with other subrate calls, and "stuffed" into 64 kilobit signals each destined for a common switching module (SM), (Action Block 515). The bundling which takes place in Action Block 515 can also include bundling of separate traffic of a compressed full rate incoming trunk as further discussed below with respect to Action Block 523, and as shown with respect to demultiplexer 103 and split/compress circuits 113 and 114 of FIG. 2. Test 519 is then used to determine in the destination switch module if the desti-nation is a line or trunk. If test 519 indicates that the destination is a trunk, then test 521, (FIG. 5), is used to determine whether the trunk is connected to an office that is capable of accepting subrate signals, and is willing to accept such signals; determining the result of Test 521 can be performed as a data base look-up in the originating switch, or can be performed as a query of the connected switch or a query of a shared data base. If not, then subrate signals are split (Action Block 526), the connected switch is notified (Action Block 527), and decompressed to 64 kilobit per second signals (Action Block 528). They are then multiplexed as 64 kilobit per second channels onto a trunk in a trunk unit such as Trunk Unit 12, (Action Block 529), and the calls are sent to the next switch, (Action Block 530).

If the remote switch is capable of accepting subrate signals, (positive result of test 521), then test 522 is used to determine whether any subrate channels to the remote are idle. If so, then the subrate calls are repackaged for common destinations so that a plurality of calls, the number determined by the compression ratio, can be transmitted over a single 64K channel to the remote switch. The remote switch is then notified via CCS7 message of the call location and rate, i.e., the particular channel carrying the call, the rate of the call, and the particular position of that call within a 64 kilobit signal. The actions of Action Blocks 529 and 530 previously described, are then followed. If no subrate channels are idle, (negative result of test 522), then this switch negotiates with the remote switch concerning a 64 kilobit channel and the rate of sub-channels to be used. After a successful negotiation, Action Block 523 (previously described) is entered.

If the result of Test 519 (FIG. 4), has indicated that the call is to be transmitted to a line, then any subrate signals are split, (Action Block 531 (FIG. 5)), and expanded (Action Block 533), and routed to the terminating line (Action Block 535).

Figure 6:
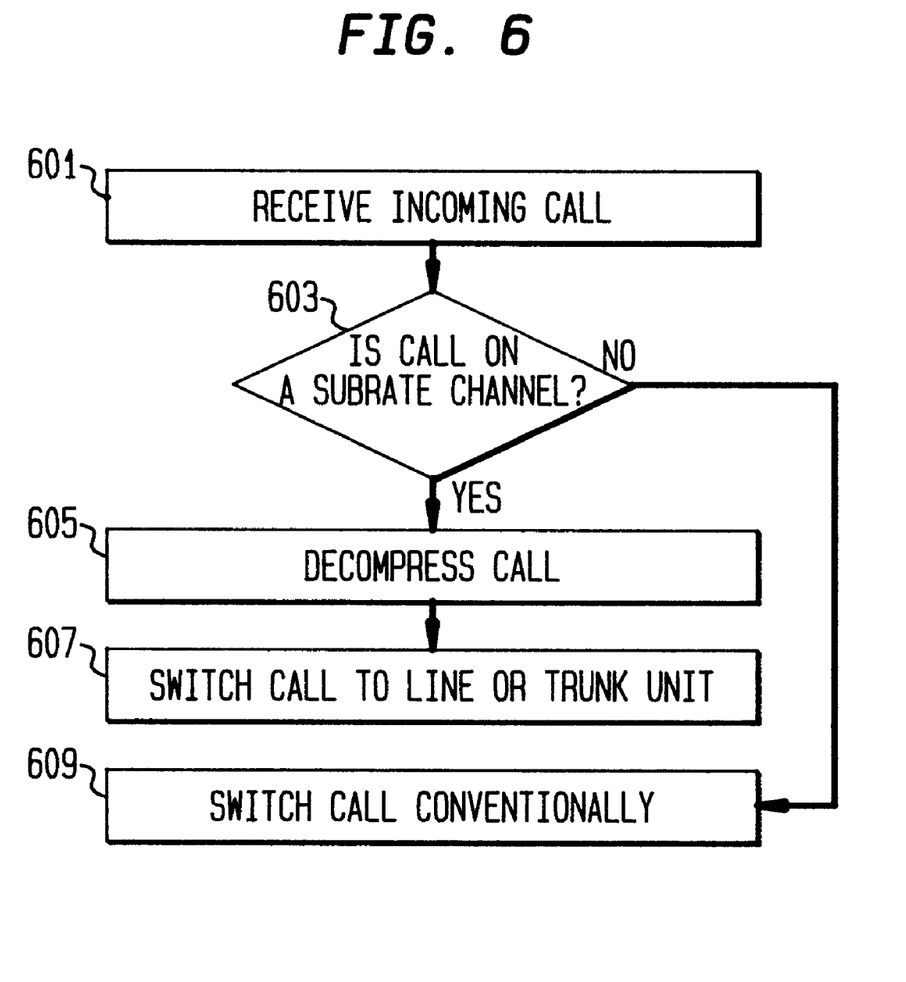
FIG. 6 is a flow diagram showing the progress of an incoming call.

FIG. 6 illustrates an incoming call. The incoming call is received (Action Block 601). A test is made whether the call is a subrate call (Test 603). If not, the call is processed conventionally (Action Block 609). If so, the call is decompressed (Action Block (605). The decompressed call is then switched to a destination line or trunk circuit (Action Block 607). Where possible, the decompression should be performed in a unit connected to a destination line or trunk unit of the call; if this is not possible because other subrate calls of the same 64K channel are already being routed to a decompress unit not connected to the destination unit, then the decompressed call is connected back to the Main TSI Unit for further switching.

The above description is of the most generalized application of Applicants' invention. The cost of different piece parts and of transmission facilities will help to determine which features of Applicants invention should be used for a particular switch, or for a particular application. For example, Applicants have shown arrangements which allow the various sub-channels of an incoming trunk to be unbundled, and rebundled into a new 64K signal prior to being switched in the main TSI. In alternative arrangements, such trunks could be connected directly to the main TSI and, if necessary, their decompressed signals derived after having been switched as one bundle to the main TSI could, if necessary, be re-switched through the main TSI to a different switching module. The arrangement has been generalized to allow for the use of a plurality of different compression rates. Clearly, if the cost of compression rates below 32K is high, then it might be economical to use this arrangement only for compressing to 32K. In the preferred embodiment, a tone signal is provided whenever a call signal is compressed; alternatively, a signal for actuating a visual display or lamp may be used. In view of the high quality of compression to 32K, it may not be necessary to warn users of compression unless compression to a lower rate such as 16K, or 8K is used. Clearly, one advantage of compressing only to 32K is that it is necessary to provision only two compress circuits, and two decompress circuits for each 64K signal appearing at the demultiplexed input to the compress unit 1 and decompress unit 2.

In this specific embodiment, a separate split circuit precedes the decompress circuit of decompress unit 2. In other embodiments, the splitting circuit can be made part of the decompress circuit, and can simply act as a selector of incoming bytes to be used by the decompress circuit.

In Applicants' preferred embodiment, incoming trunks are connected to a split/compress circuit 113 which permits compression if a trunk is carrying only a single signal or splitting into a plurality of sub-rate signals if the trunk is carrying a composite signal. An alternative would be to connect such trunks directly to the main TSI, and for the case in which the trunk is carrying a composite signal, switching that composite signal to a decompress unit, one of whose output multiplexers is connected back to the input of the main TSI unit 3 for further switching of the decompressed (64K) signals, representing the subrate signals carried by the trunk.

For private networks supported by public switches and facilities, dedicated subrate channels can be used over dedicated facilities. This would allow the users of the private networks to pay a lower tariff since they would require fewer dedicated trunks.

It is also possible to supply a line such as an ISDN (Integrated Services Digital Network) line with compress and decompress circuits to allow that line to carry multiple channels. The output of such a line to the switch would normally bypass compression in the switch, for example, by being connected to a line unit such as line unit 11, and its input from the switch would be a multiple channel signal that would not have been decompressed. For an ISDN line, the signaling channel can convey to the switch the breakdown of subrate channels of a 64K signal, and the identity of the destination of each subrate channel, or in the other direction, the identity of the customer's channel for each received subrate channel. The subrate channels received in the switch from such lines can then be switched using the TSI of the decompress unit and if necessary, the reswitching facility through Main TSI Unit 3. When all subrate channels of such a line have a common destination, no subrate channel switching is performed in the switch and the full 64K signal is switched as a single entity.

The above description is of one preferred embodiment of Applicants' invention. Many other embodiments will be apparent to those of ordinary skill in the art. The invention is limited only by the attached claims.

What is claimed is:

1. In a digital switching system, apparatus for switching calls comprising:
    means for compressing ones of a plurality of full rate signals into a plurality of composite signals, each composite signal carrying a plurality of sub-rate signals representing ones of said plurality of full rate signals;
    means for switching said composite signals; and
    means for decompressing ones of the switched composite signals into full rate signals;
    means for receiving composite signals from other digital switches and means for unbundling said received composite signals, and decompressing the unbundled signals into a plurality of full rate signals for further switching in said digital switching system.

2. In a digital switching system, apparatus for switching calls comprising:
    means for compressing ones of a plurality of full rate signals into a plurality of composite signals, each composite signal carrying a plurality of sub-rate signals representing ones of said plurality of full rate signals;
    means for switching said composite signals; and
    means for decompressing ones of the switched composite signals into full rate signals;
    wherein subrate switching is only used if a traffic load on said switching system exceeds a threshold.

3. In a digital switching system, apparatus for switching calls comprising:
    means for compressing ones of a plurality of full rate signals into a plurality of composite signals, each composite signal carrying a plurality of sub-rate signals representing ones of said plurality of full rate signals;

means for switching said composite signals; and means for decompressing ones of the switched composite signals into full rate signals;

means for informing a customer that subrate switching is being used on a call.

4. The apparatus of claim 3 wherein said means for informing a customer comprises means for applying a tone to said call.

5. In a digital switching system, apparatus for switching calls comprising:

means for compressing ones of a plurality of full rate signals into a plurality of composite signals, each composite signal carrying a plurality of sub-rate signals representing ones of said plurality of full rate signals;

means for switching said composite signals; and means for decompressing ones of the switched composite signals into full rate signals;

means for extracting subrate signals from the switched composite signals, and combining a plurality of the extracted signals into a composite signal for transmission over a trunk to a connected switching system.

6. The apparatus of claim 5 wherein said means for extracting and combining, comprises a time slot interchange unit for receiving switched composite signals and deriving composite signals comprising subrate channels from a plurality of switched composite signals.

7. In a digital switching system, apparatus for switching calls comprising:

means for compressing ones of a plurality of full rate signals into a plurality of composite signals, each composite signal carrying a plurality of sub-rate signals representing ones of said plurality of full rate signals;

means for switching said composite signals; and means for decompressing ones of the switched composite signals into full rate signals;

wherein said means for compressing comprises means for compressing full rate signals into subrate signals and a time slot interchange unit for switching said subrate signals and combining them into a composite full rate signal.

8. In a digital switching system, apparatus for switching calls comprising:

means for compressing ones of a plurality of full rate signals into a plurality of composite signals, each composite signal carrying a plurality of sub-rate signals representing ones of said plurality of full rate signals;

means for switching said composite signals; and means for decompressing ones of the switched composite signals into full rate signals;

wherein said means for decompressing comprises means for decompressing a subrate signal into a full-rate signal, and a time slot interchange unit for switching full-rate signals toward a destination.

9. In a digital switching system, apparatus for switching calls comprising:

means for compressing ones of a plurality of full rate signals into a plurality of composite signals, each composite signal carrying a plurality of sub-rate signals representing ones of said plurality of full rate signals;

means for switching said composite signals; and means for decompressing ones of the switched composite signals into full rate signals;

means for receiving composite signals from digital lines and means for unbundling said received composite signals, and decompressing the unbundled signals into a plurality of full rate signals for further switching in said digital switching system.

* * * * *